United States Patent
Giaimo et al.

(10) Patent No.: US 7,753,647 B2
(45) Date of Patent: Jul. 13, 2010

(54) LIGHTWEIGHT CAST INNER DIAMETER VANE SHROUD FOR VARIABLE STATOR VANES

(75) Inventors: John A. Giaimo, Weston, FL (US); John P. Tirone, III, Moodus, CT (US)

(73) Assignee: United Technologies Corporation, Hartford, CT (US)

( * ) Notice: Subject to any disclaimer, the term of this patent is extended or adjusted under 35 U.S.C. 154(b) by 600 days.

(21) Appl. No.: 11/185,956

(22) Filed: Jul. 20, 2005

(65) Prior Publication Data

US 2007/0020093 A1    Jan. 25, 2007

(51) Int. Cl.
*F01D 17/16* (2006.01)
(52) U.S. Cl. ..................................... 415/160
(58) Field of Classification Search ............. 415/149.4, 415/150, 159–166, 189–190, 209.2, 209.3, 415/209.4, 210.1
See application file for complete search history.

(56) References Cited

U.S. PATENT DOCUMENTS

| | | | | |
|---|---|---|---|---|
| 2,233,983 | A * | 3/1941 | Kice, Jr. | 415/160 |
| 2,805,818 | A * | 9/1957 | Ferri | 415/148 |
| 2,917,275 | A * | 12/1959 | Magin | 415/160 |
| 2,933,234 | A * | 4/1960 | Neumann | 415/149.4 |
| 2,994,509 | A * | 8/1961 | Walker | 415/159 |
| 3,025,036 | A * | 3/1962 | Kumm et al. | 415/149.4 |
| 3,113,430 | A * | 12/1963 | Beale et al. | 415/163 |
| 3,314,654 | A * | 4/1967 | Thenault et al. | 415/160 |
| 3,352,537 | A * | 11/1967 | Petrie | 415/149.4 |
| 3,632,224 | A * | 1/1972 | Wright et al. | 415/149.4 |
| 3,685,920 | A * | 8/1972 | Burge | 415/160 |
| 3,816,021 | A * | 6/1974 | Lewis et al. | 415/163 |
| 3,836,281 | A * | 9/1974 | Czuszak | 415/209.2 |
| 3,908,362 | A | 9/1975 | Szydlowski | |
| 4,044,815 | A | 8/1977 | Smashey et al. | |
| 4,695,220 | A | 9/1987 | Dawson | |
| 4,792,277 | A * | 12/1988 | Dittberner et al. | 415/160 |
| 4,812,106 | A * | 3/1989 | Purgavie | 415/160 |
| 4,834,613 | A | 5/1989 | Hansen et al. | |
| 4,836,746 | A | 6/1989 | Owsianny et al. | |
| 4,990,056 | A * | 2/1991 | McClain et al. | 415/160 |
| 5,024,580 | A | 6/1991 | Olive | |
| 5,039,277 | A | 8/1991 | Naudet | |
| 5,328,327 | A * | 7/1994 | Naudet | 415/160 |
| 5,380,152 | A * | 1/1995 | Sikorski et al. | 415/160 |
| 5,387,080 | A * | 2/1995 | Bouhennicha et al. | 415/150 |
| 5,601,401 | A * | 2/1997 | Matheny et al. | 415/160 |
| 5,630,701 | A * | 5/1997 | Lawer | 415/160 |
| 6,283,705 | B1 | 9/2001 | Rice et al. | |
| 6,321,449 | B2 | 11/2001 | Zhao et al. | |

(Continued)

FOREIGN PATENT DOCUMENTS

GB    907323    10/1962

(Continued)

*Primary Examiner*—Christopher Verdier
(74) *Attorney, Agent, or Firm*—Kinney & Lange, P.A.

(57) ABSTRACT

An inner diameter vane shroud for use in a gas turbine engine is comprised of lightweight cast forward and aft shroud components. The forward and aft shroud components are made with an investment casting technique that creates a hollow cavity that runs in a circumferential direction through each component. The forward and aft shroud components are matable to form sockets that receive inner diameter ends of variable stator vanes.

15 Claims, 4 Drawing Sheets

U.S. PATENT DOCUMENTS

| | | |
|---|---|---|
| 6,413,043 B1 | 7/2002 | Bouyer |
| 6,688,846 B2 * | 2/2004 | Caubet et al. ............... 415/160 |
| 6,799,945 B2 * | 10/2004 | Chatel et al. ................ 415/160 |
| 6,843,638 B2 | 1/2005 | Hidalgo et al. |
| 7,104,754 B2 * | 9/2006 | Willshee et al. ............. 415/159 |
| 2003/0113204 A1 * | 6/2003 | Wolf .......................... 415/165 |

FOREIGN PATENT DOCUMENTS

| | | |
|---|---|---|
| GB | 913147 | 12/1962 |
| GB | 1153134 | 5/1969 |
| GB | 2294094 A | 4/1996 |

* cited by examiner

LIGHTWEIGHT CAST INNER DIAMETER VANE SHROUD FOR VARIABLE STATOR VANES

This invention was made with U.S. Government support under contract number N00019-02-C-3003 awarded by the United States Navy, and the U.S. Government may have certain rights in the invention.

CROSS-REFERENCE TO RELATED APPLICATION(S)

The present application is related to the following copending applications filed on the same day as this application: "RACK AND PINION VARIABLE VANE SYNCHRONIZING MECHANISM FOR INNER DIAMETER VANE SHROUD" by inventors J. Giaimo and J. Tirone III (application Ser. No. 11/185,622); "SYNCH RING VARIABLE VANE SYNCHRONIZING MECHANISM FOR INNER DIAMETER VANE SHROUD" by inventors J. Giaimo and J. Tirone III (application Ser. No. 11/185,623); "GEAR TRAIN VARIABLE VANE SYNCHRONIZING MECHANISM FOR INNER DIAMETER VANE SHROUD" by inventors J. Giaimo and J. Tirone III (application Ser. No. 11/185,624); and "INNER DIAMETER VARIABLE VANE ACTUATION MECHANISM" by inventors J. Giaimo and J. Tirone III (application ser. No. 11/185,995). All of these applications are incorporated herein by this reference.

BACKGROUND OF THE INVENTION

This invention relates generally to gas turbine engines and more particularly to vane shrouds for use in such engines.

Gas turbine engines operate by combusting a fuel source in compressed air to create heated gases with increased pressure and density. The heated gases are ultimately forced through an exhaust nozzle, which is used to step up the velocity of the exiting gases and in-turn produce thrust for driving an aircraft. The heated gases are also used to drive a turbine for rotating a fan to provide air to a compressor section of the gas turbine engine. Additionally, the heated gases are used to drive a turbine for driving rotor blades inside the compressor section, which provides the compressed air used during combustion. The compressor section of a gas turbine engine typically comprises a series of rotor blade and stator vane stages. At each stage, rotating rotor blades push air past the stationary stator vanes. Each rotor/stator stage increases the pressure and density of the air. Stators serve two purposes: they convert the kinetic energy of the air into pressure, and they redirect the trajectory of the air coming off the rotors for flow into the next compressor stage.

The speed range of an aircraft powered by a gas turbine engine is directly related to the level of air pressure generated in the compressor section. For different aircraft speeds, the velocity of the airflow through the gas turbine engine varies. Thus, the incidence of the air onto rotor blades of subsequent compressor stages differs at different aircraft speeds. One way of achieving more efficient performance of the gas turbine engine over the entire speed range, especially at high speed/high pressure ranges, is to use variable stator vanes which can optimize the incidence of the airflow onto subsequent compressor stage rotors.

Variable stator vanes are typically circumferentially arranged between an outer diameter fan case and an inner diameter vane shroud. In split shroud designs, the vane shroud is divided into a forward and aft component, with inner diameter ends of the variable stator vanes secured between the two components. Traditionally, the forward and aft components of the inner diameter vane shroud have been fabricated from solid metal pieces. These solid metal vane shrouds are typically used in ground test engines where weight is not a concern. However, these solid vane shrouds are not suitable for use in production engines used in aircraft where weight is of the utmost concern. Thus, there is a need for a flight-weight inner diameter variable vane shroud.

BRIEF SUMMARY OF THE INVENTION

The present invention is directed toward an inner diameter vane shroud for receiving inner diameter ends of stator vanes in a turbine engine. The inner diameter vane shroud includes a forward shroud component and an aft shroud component. The forward shroud component has a defined length and includes a forward hollow channel running the length of the forward shroud component. The aft shroud component has a defined length and includes an aft hollow channel running the length of the aft shroud component.

DETAILED DESCRIPTION

Figure 1:
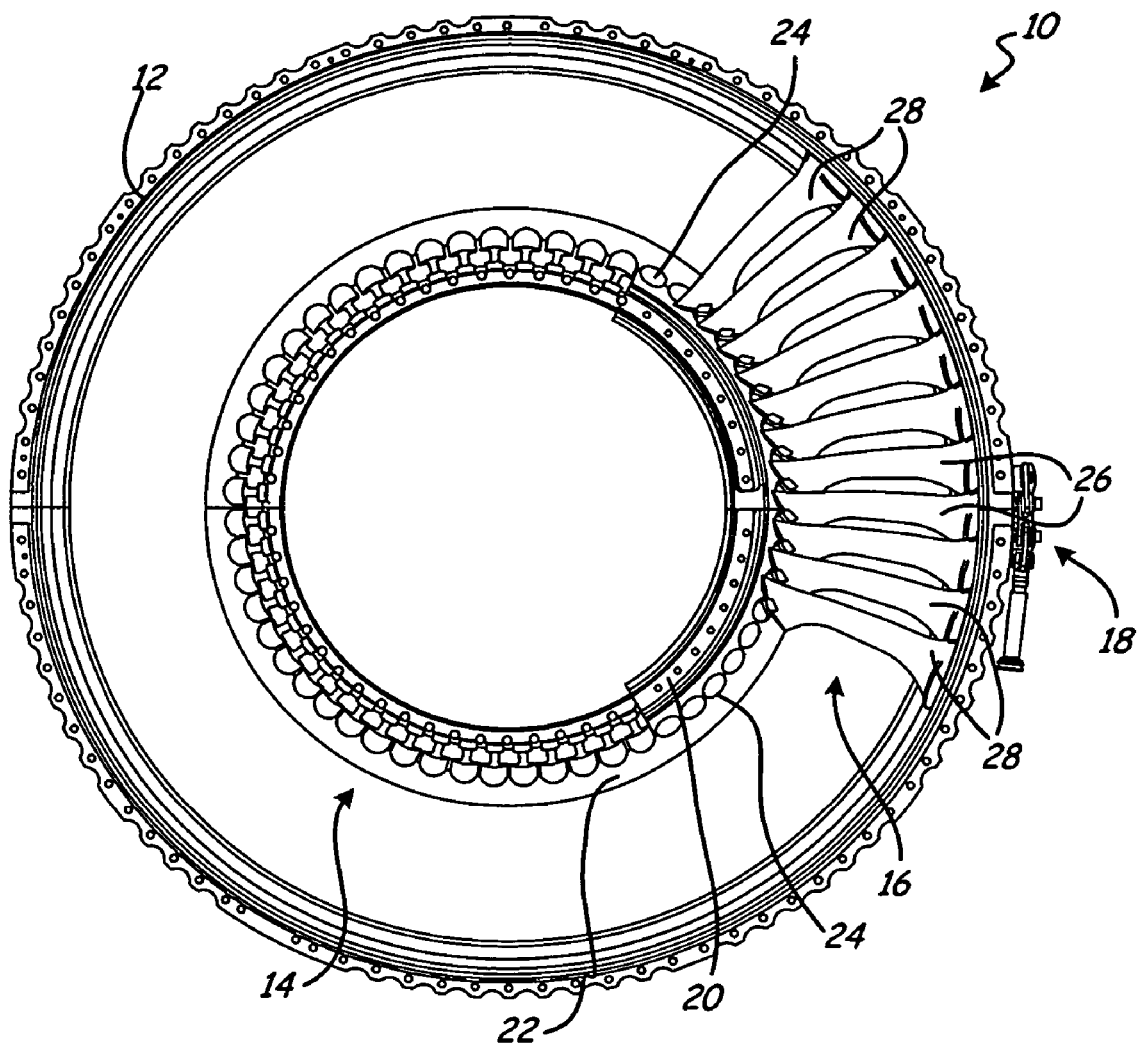
FIG. 1 shows a partially cut away front view of a stator vane section of a gas turbine engine in which the present invention is used.

FIG. 1 shows a partially cut away front view of stator vane section 10 of a gas turbine engine in which the present invention is used. Stator vane section 10 comprises fan case 12, vane shroud 14, variable vane array 16 and actuator 18. Vane shroud 14 is comprised of forward vane shroud component 20 and aft vane shroud component 22, which form inner diameter vane sockets 24. A half-socket, or a recess, is located on each of forward shroud portion 20 and aft shroud portion 22 to form socket 24. In FIG. 1, only a portion of forward vane shroud 20 is shown so that the interior of sockets 24 can be seen. Inner diameter vane shroud 14 can be constructed in component sizes less than the entire circumference of inner diameter vane shroud. In one embodiment, as shown in FIG. 1, forward vane shroud component 20 is made of sections approximately one sixth (i.e. 60°) of the circumference of inner diameter vane shroud 14, and aft shroud component 22 is made of sections one half (i.e. 180°) the circumference of inner diameter vane shroud 14.

Variable vane array 16 is comprised of drive vanes 26 and a plurality of follower vanes 28. Drive vanes 26 and follower vanes 28 are connected inside inner diameter vane shroud 14 by a synchronizing mechanism such as described in the copending related applications referred to above. Thus, when actuator 18 rotates drive vanes 26, follower vanes 28 rotate a like amount.

Typically, follower vanes 28 encircle the entirety of vane shroud 14. Only a portion of variable vane array 16 is shown so that sockets 24 can be seen. Drive vanes 26 and follower vanes 28 are rotatably mounted at the outer diameter of stator vane section 10 in fan case 12, and at the inner diameter of stator vane section 10 in vane shroud 14. The number of drive vanes 26 varies in other embodiments and can be as few as one. In one embodiment, variable vane array 16 includes fifty-two follower vanes 28 and two drive vanes 26. Drive vanes 26 are similar in construction to follower vanes 28. In one embodiment, drive vanes 26 are of heavy duty construction to withstand forces applied by actuator 18.

Stator vane section 10 is typically located in a compressor section of a gas turbine engine downstream of, or behind, a rotor blade section. Air is forced into stator vane section 10 by a preceding rotor blade section or by a fan. The air that passes through stator vane section 10 typically passes on to an additional rotor blade section. Drive vanes 26 and follower vanes 28 rotate along their respective radial positions in order to control the flow of air through the compressor section of the gas turbine engine.

Figure 2:
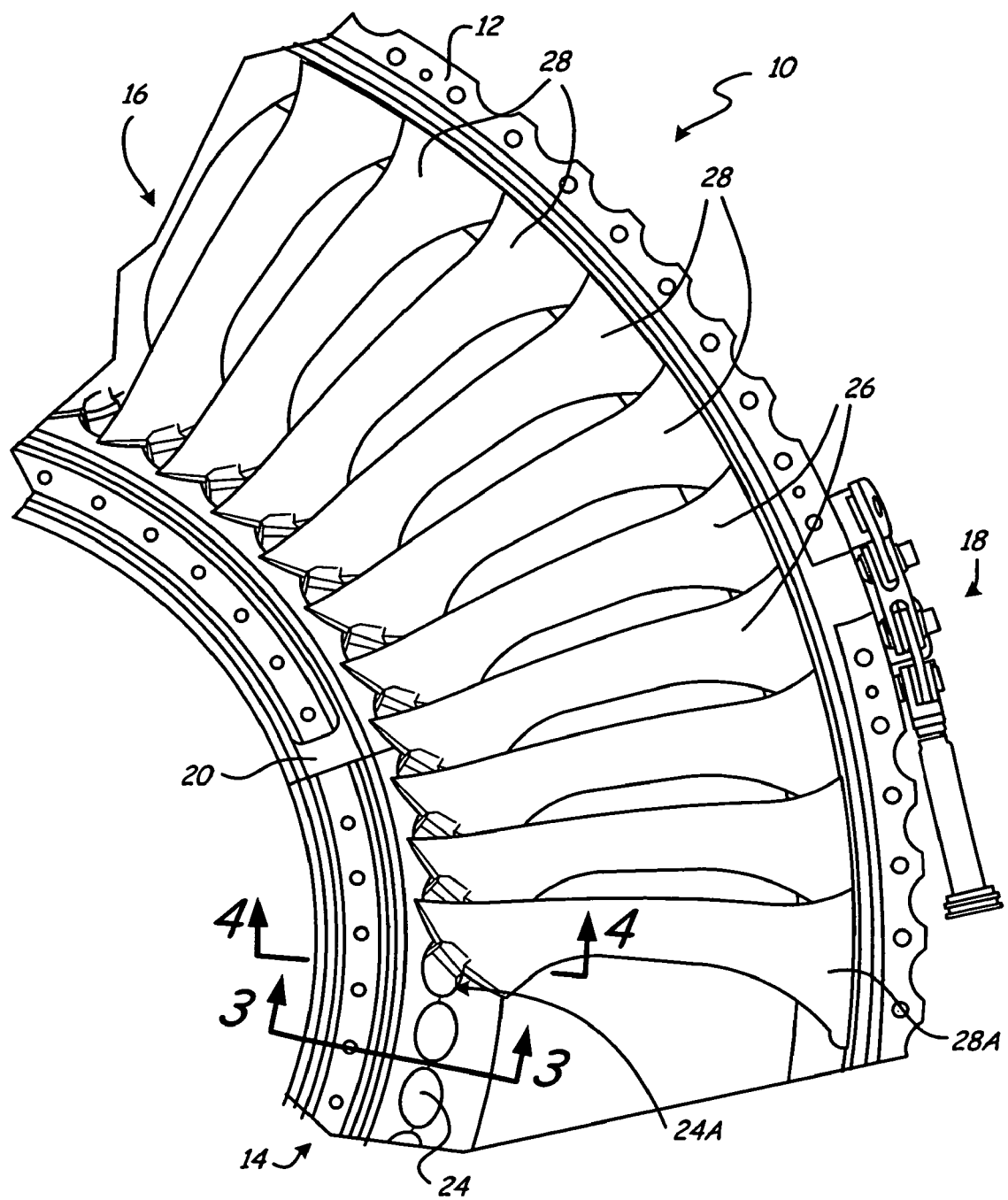
FIG. 2 shows a close up of a stator vane array positioned between a fan case and the inner diameter vane shroud of the present invention.

FIG. 2 shows a close up of variable vane array 16 between fan case 12 and vane shroud 14. Drive vanes 26 and follower vanes 28 are rotatable in sockets 24 of inner diameter vane shroud 14. Section 3-3 is taken at a position along inner diameter vane shroud 14 between sockets 24. Between sockets 24, forward shroud component 20 and aft shroud component 22 are fastened together to form inner diameter vane shroud 14. Section 44 is taken at a position along inner diameter vane shroud 14 where inner diameter end of follower vane 28A is inserted in socket 24A. Forward shroud component 20 and aft shroud component 22 come together to form sockets 24 for securing the inner ends of variable vane array 16.

Figure 3A:
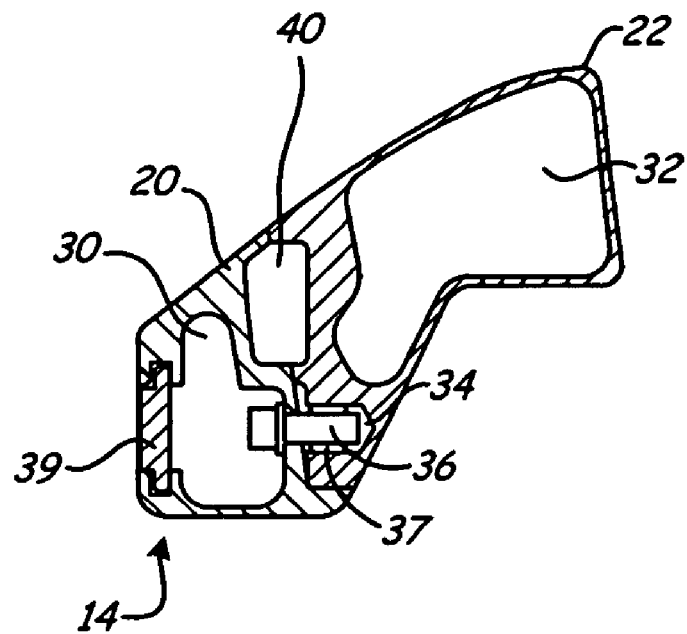
FIG. 3A shows section 3-3 of FIG. 2 showing a cross section of the inner diameter vane shroud between the vane sockets.
Figure 3B:
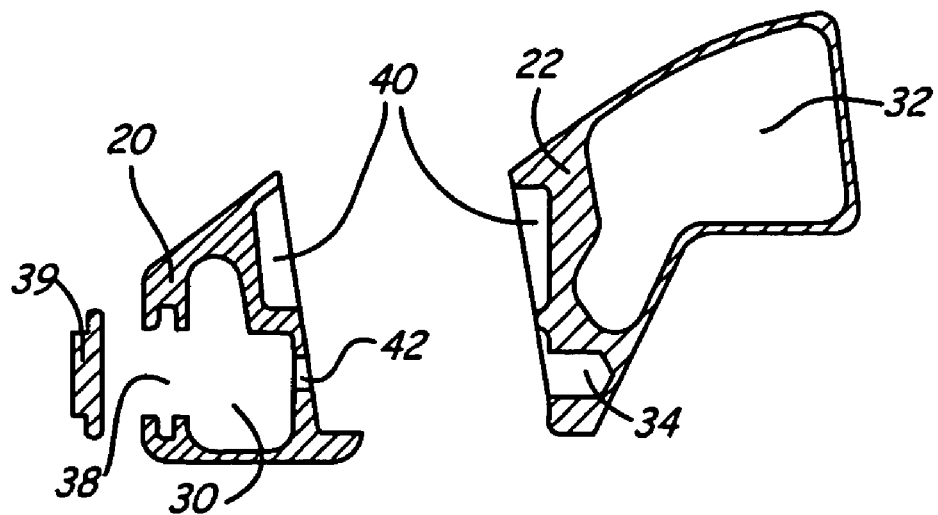
FIG. 3B shows an exploded view of the cross section of the inner diameter vane shroud of FIG. 3A.

FIG. 3A shows section 3-3 of FIG. 2 showing a cross section of inner diameter vane shroud 14 between vane sockets 24. FIG. 3B shows an exploded view of the cross section of the inner diameter vane shroud of FIG. 3A. FIGS. 3A and 3B will be discussed concurrently. Inner diameter vane shroud 14 includes forward shroud component 20, aft shroud component 22, forward hollow region 30, aft hollow region 32, hole 34, fastener 36, locking insert 37, opening 38, cap 39, recess 40 and hole 42.

Forward hollow region 30 and aft hollow region 32 are formed during the manufacture of forward vane shroud component 20 and aft vane shroud component 22 using investment casting techniques known in the art. In one embodiment, ceramic cores are placed in the mold during the casting of forward shroud component 20 and aft shroud component 22. The ceramic cores are removed after molds of forward vane shroud component 20 and aft vane shroud component 22 have solidified and cooled in order to create forward hollow region 30 and aft hollow region 32, respectively. Forward hollow region 30 and aft hollow region 32 reduce the amount of material required to produce forward shroud component 20 and aft shroud component 22 thereby reducing the weight of inner diameter vane shroud 14. Inner diameter vane shroud 14 remains sturdy enough to secure drive vanes 26 and follower vanes 28 during operation of a gas turbine engine. Lightweight cast forward shroud component 20 and aft shroud component 22 are also capable of being machined to meet the design requirements of the stator vanes and gas turbine engine with which they are to be used.

Forward vane shroud component 20 is cast with opening 38, which provides access to forward hollow region 30. In other embodiments, opening 38 can be produced with machining procedures after casting. Additional features of forward vane shroud component 20 are machined into forward vane shroud component 20 after casting. For example, recess 40 can be machined into forward shroud component 20 and aft shroud component 22 as a weight reduction measure. Hole 34 and hole 42 can be produced with additional machining steps. The exact shape and form of hole 34 and recess 40 depend on specific design requirements of gas turbine engine in which inner diameter vane shroud 14 will be used. Forward vane shroud component 20 and aft vane shroud component 22 can be made in segments less than entire circumference of the final required inner diameter vane shroud 14. In one embodiment, forward vane shroud component 20 is comprised of approximately one sixth circle (i.e. 60°) segments and aft vane shroud component 22 is comprised of approximately half circle (i.e. 180°) segments for use in split fan case designs.

Inner diameter vane shroud 14 is assembled by securing forward shroud component 20 to aft shroud component 22 with fastener 36. Locking insert 37 is placed inside hole 34 across from hole 42. Fastener 36 is inserted through forward hollow region 30, through hole 42 and into locking insert 37 of hole 34. Cap 39 is placed over opening 38 to close it off and provide an aerodynamic surface to the front of forward vane shroud component 20. Drive vanes 26 and follower vanes 28 are inserted into sockets 24 before assembly of forward shroud component 20 and aft shroud component 22.

Figure 4A:
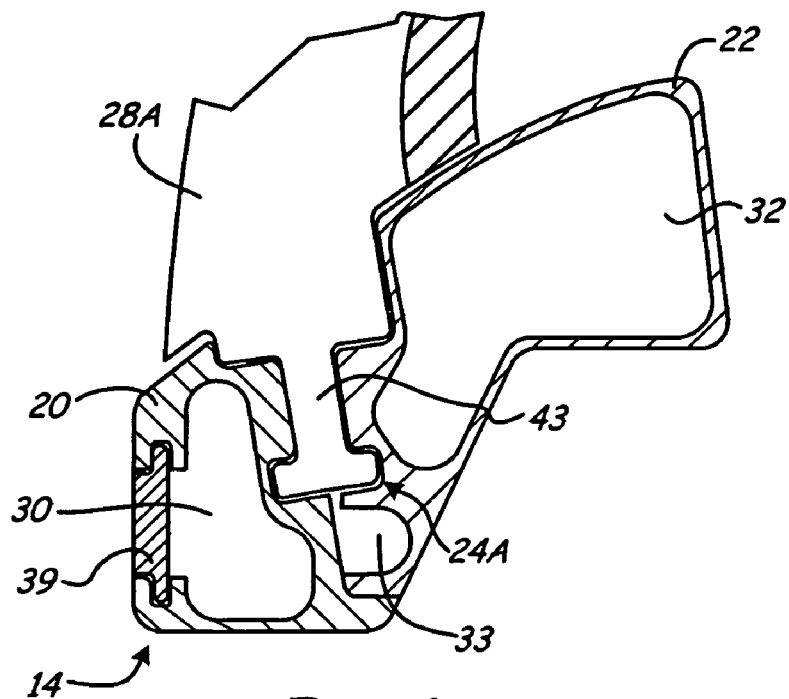
FIG. 4A shows section 4-4 of FIG. 2 showing a cross section of the inner diameter vane shroud at the vane sockets.
Figure 4B:
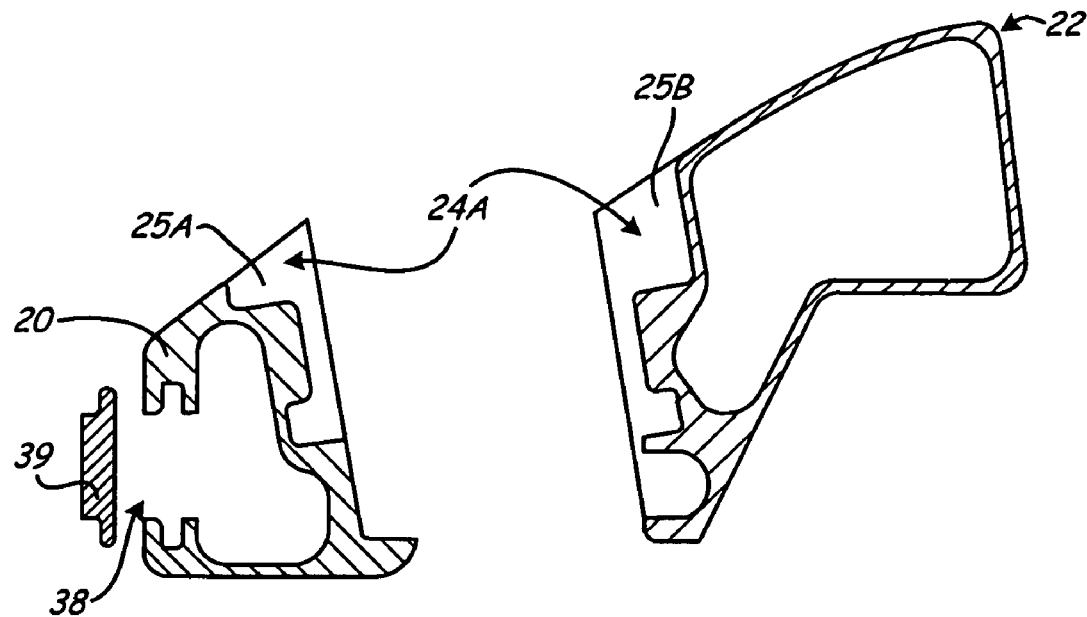
FIG. 4B shows an exploded view of the cross section of the inner diameter vane shroud of FIG. 4A.

FIG. 4A shows section 4-4 of FIG. 2 showing a cross section of inner diameter vane shroud 14 at vane sockets 24. FIG. 4B shows an exploded view of the cross section of the inner diameter vane shroud of FIG. 4A. FIGS. 4A and 4B will be discussed concurrently. Inner diameter vane shroud 14 includes forward shroud component 20, aft shroud component 22, socket 24A, forward hollow region 30, aft hollow region 32, recess 33, opening 38, and cap 39. Follower vane 28A includes trunnion 43, which is pivotably located in socket 24A of inner diameter vane shroud 14. Socket 24A is comprised of recess 25A and recess 25B. Forward vane shroud component 20 and aft vane shroud component 22 come together to form socket 24A when forward vane shroud component 20 is secured to aft vane shroud component 22 using fastener 36 as shown in FIG. 3A. Socket 24A is shaped to have a profile for accepting the profile of trunnion 42. Thus, trunnion 43 is secured in socket 24A and able to rotate in socket 24A. Recess 33 is molded directly into or machined into aft shroud component 22 as a weight reduction measure.

Although the present invention has been described with reference to preferred embodiments, workers skilled in the art will recognize that changes may be made in form and detail without departing from the spirit and scope of the invention.

The invention claimed is:

1. A stator vane section for use in a turbine engine, the stator vane section comprising:
   an outer diameter fan case;
   a plurality of stator vanes each comprising:
      an inner diameter end; and
      an outer diameter end for rotating in the outer diameter fan case;
   an inner diameter vane shroud comprising:
      a forward inner diameter shroud component comprising:
         a forward hollow channel running circumferentially through an interior of the forward shroud component;
         a forward fastener hole extending through the forward inner diameter vane shroud component to intersect the forward hollow channel; and
         a plurality of forward recesses; and
      an aft shroud component comprising:

an aft hollow channel running circumferentially through an interior of the aft shroud component;

an aft fastener hole extending into and terminating within the aft shroud component so as to align with the forward fastener hole and not intersect the aft hollow channel; and a plurality of aft recesses that mate with the forward recesses to receive the inner diameter ends of stator vanes.

2. The stator vane section of claim 1 wherein the aft fastener hole of the aft shroud component includes a locking insert for securing a threaded fastener within the aft fastener hole of the aft shroud component.

3. The stator vane section of claim 1 wherein the forward shroud component comprises an opening to allow access to the forward hollow channel, the opening including a removable cap for sealing the opening.

4. The stator vane section of claim 1 and further comprising an interior cavity positioned between the forward inner diameter shroud component and the aft shroud component and flanked by forward and aft recesses.

5. The stator vane section of claim 1 wherein the forward inner diameter shroud component and the aft shroud component are produced by investment casting.

6. A vane shroud segment comprising:

an arcuate body portion;

a mating surface comprising:
    partial sockets for receiving inner diameter ends of stator vanes; and
    a weight-reducing depression positioned adjacent each of the partial sockets;

an internal hollow channel extending through an interior of the arcuate body portion and across the length of the arcuate body portion alongside the partial sockets and weight reducing depressions; and a fastener hole extending into the mating surface radially inward of the partial sockets and weight-reducing depressions so as to not intersect the internal hollow channel.

7. The vane shroud segment of claim 6 wherein the fastener hole includes a locking insert for securing a threaded fastener within the fastener hole.

8. The vane shroud segment of claim 6 wherein the arcuate body portion comprises an opening to allow access to the internal hollow channel, the opening including a removable cap for sealing the opening.

9. The vane shroud segment of claim 6 wherein the arcuate body portion comprises a plurality of holes for receiving threaded fasteners.

10. The vane shroud segment of claim 6 wherein the internal hollow channel is produced by an investment casting process.

11. An inner diameter vane shroud having a forward shroud component and an aft shroud component that mate to form sockets for receiving inner diameter ends of variable stator vanes, the inner diameter vane shroud characterized by:

a forward hollow channel running through an interior of the forward shroud component;

a forward fastener hole extending through the forward shroud component to intersect the forward hollow channel;

an aft hollow channel running through an interior of the aft shroud component; and an aft fastener hole extending into and terminating within the aft shroud component so as to not intersect the aft hollow channel;

wherein the hollow channels are produced by an investment casting process; and wherein the sockets are disposed between the forward and aft hollow channels so as to not intersect the channels.

12. The vane shroud of claim 11 wherein the holes of the aft shroud component include locking inserts for securing the threaded fasteners within the holes of the aft shroud component.

13. The vane shroud of claim 11 wherein the forward shroud component comprises an opening to allow access to the forward hollow channel.

14. The vane shroud of claim 13 wherein the forward shroud component includes a removable cap for sealing the opening.

15. The inner diameter vane shroud of claim 11 wherein the inner diameter vane shroud is further characterized by a plurality of weight-reducing depressions positioned along mating surfaces of the forward shroud component and the aft shroud component.

* * * * *